3,271,247
BIRD REPELLENT COMPOSITIONS
Andrew J. Reinert, Ernest A. Zuech, and Kenneth E. Cantrel, Bartlesville, Okla., assignors to Phillips Petroleum Company, a corporation of Delaware
No Drawing. Filed Dec. 14, 1964, Ser. No. 418,287
8 Claims. (Cl. 167—46)

This invention relates to bird repellents. In one aspect, this invention relates to a method of rendering a locus repellent to birds. In another aspect, this invention relates to novel bird repellent compositions.

The task of repelling or deterring birds from resting on windowsills, roofs, and ledges of buildings has become increasingly difficult. Thousands of dollars are spent each year by property owners, especially in large metropolitan areas, for cleaning buildings which have served as resting places for such birds as starlings, pigeons, sparrows and the like. Although devices such as scarecrows, noisemakers, etc., have been used with moderate success for discouraging birds from resting in open fields and the like, these devices are obviously not adaptable for use on or near buildings which afford a variety of different resting places for birds. Moreover, it frequently happens that birds become so accustomed to devices of this type that they are no longer effective for discouraging birds from landing.

In the practice of this invention, birds are discouraged from resting on a particular surface by applying a novel bird repellent composition to the surface. The novel bird repellent composition which we have discovered for this purpose is the mineral acid-insoluble portion of the reaction product obtained by reacting a conjugated diolefin with an amine.

Accordingly, it is an object of this invention to provide a novel bird repellent composition.

Another object of this invention is to provide an effective method of rendering a locus repellent to birds.

A further object of this invention is to provide a simple and efficient method of preventing birds from resting on a surface.

These and other objects of the invention will become apparent to one skilled in the art after studying the following detailed description and the appended claims.

According to the present invention, a surface can be rendered repellent to birds by applying to said surface the mineral acid-insoluble portion of the reaction product obtained by reacting a conjugated diolefin with an amine. Amine as used herein is intended to include ammonia. The conjugated diolefins which can be used to prepare the novel bird repellent compounds of this invention include 1,3-butadiene, isoprene (2-methyl-1,3-butadiene), piperylene (1,3-pentadiene), 1-phenyl-1,3-butadiene, and 2,3-dimethyl-1,3-butadiene. The amine which can be used for producing the novel bird repellent compounds of this invention includes ammonia and primary or secondary amines as represented by the formula

wherein $R_1$ is selected from the group consisting of hydrogen, alkyl, aryl, aralkyl, alkaryl, cycloalkyl, and combinations thereof, and $R_2$ is selected from the group consisting of hydrogen, alkyl, aryl, aralkyl, alkaryl, cycloalkyl, and combinations thereof, and wherein the total number of carbon atoms represented by $R_1$ and $R_2$ does not exceed 12. $R_1$ and $R_2$ together with other atoms can form a heterocyclic ring. Specific amines defined by the above formula which can be reacted with the conjugated diolefins to produce the novel bird repellent compounds of this invention include ammonia, methylamine, N-methylpropylamine, dibutylamine, aniline, diphenylamine, N-methylaniline, toluidines, benzylamine, morpholine, cyclohexylamine, cyclopropylamine, piperidine, xylidine, and the like.

The bird repellent compounds of this invention can be prepared by reacting the conjugated diolefin with the amine in accordance with amination procedures well known in the art. Suitable catalyst materials which can be used to promote the reaction include sodamide and the alkali metal hydrides. A process which can be employed for producing the compounds of this invention is described in abandoned application Serial No. 135,290, filed December 27, 1949, by John E. Mahan and Kenneth F. Bursack.

A typical reaction for producing the compounds which find utility in accordance with this invention involves the amination of 1,3-butadiene with ammonia in the presence of a catalyst such as sodium hydride or sodamide present in an amount of from about 0.1 to 4 percent by weight of the reactants. The reaction is carried out in the liquid phase at a temperature within the range of from about 90° to 300° F. The reactants are present in a mol ratio of ammonia to 1,3-butadiene in the range of from about 0.33:1 to 30:1 with the preferred range being from about 0.5:1 to 2:1. Depending upon the operating temperature, the amination reaction can vary in duration from a few minutes up to about 24 hours. The mineral acid-insoluble portion of the amination reaction products which serve as effective bird repellents can be separated from the reaction products by a suitable acid extraction technique. On suitable method which can be used for recovering the valuable bird repellent compounds is to employ an aqueous solution of a mineral acid such as hydrochloric acid. Other mineral acids which can be used include phosphoric, sulfuric and the like. The amount of mineral acid required to effect the acid extraction can be determined by testing the aqueous phase until it tests acid to litmus paper. Other acid indicators can be used to determine the amount of acid necessary to complete the extraction. The acid-insoluble products from the amination reaction can then be withdrawn and used. Alternatively, the acid-insoluble products can be neutralized with a base such as an alkali metal hydroxide to form the free bases of the nitrogen-containing product. The acid-insoluble products are high molecular weight nitrogen-containing compounds having as many as 32 carbon atoms per molecule. The number of carbon atoms per molecule will depend primarily upon the mol ratio of the reactants and the duration of the amination reaction.

The acid-insoluble amination products can be applied to a surface from which birds are to be repelled as a pure compound or in solution in an inert solvent. Suitable inert solvents which can be used in the practice of this invention include acetone, kerosene, ethyl acetate, and isoparaffinic hydrocarbons which boil in the range of from about 260° to 800° F. The bird repellent compounds can also be applied to a surface in admixture with water in the form of an aqueous emulsion in which case a suitable emulsifying or wetting agent is used. In certain instances it may be desirable to apply the compounds as a dust or powder. The compounds can be dispersed in a solid carrier such as kieselguhr and the like when applied in this manner. A suitable adhesive can be admixed with the liquid or solid carrier such that the bird repellent compound will remain on the surface to which it is applied over extended periods of time. The use of an adhesive is generally preferred when the bird repellent is applied to exposed ledges and windowsills of buildings because it will be less affected by the action of rain and wind.

The bird repellent compounds of this invention can be applied in the previously described forms by spraying, brushing, dusting and the like. Suitable aerosol containers having an inert propellant can also be used for dispensing the compounds in accordance with practices well known in the art. It was found that an extremely uniform application can be achieved by applying the compounds by spraying. When the bird repellent compounds are dissolved in one of the inert solvents described above, the mixture contains from about 0.5 to 10 weight percent of the compound. When the compound is dispersed in a solid carrier such as kieselguhr or the like, it is present in an amount within the range of from about 0.5 to 20 weight percent based upon the total weight of the mixture. Although these ranges have been proven to be effective for repelling birds when applied to a surface, it is obvious that concentrations above and below these ranges can be used.

The bird repellent compounds of this invention are effective when present on a surface in an amount within the range of from about 0.01 to 10 grams per square foot of surface area. Although the bird repellent compounds can be applied to provide a higher concentration of compound per square foot of surface area, for economic reasons it is generally preferred to not exceed about 10 grams per square foot of area.

Four separate amination reactions were conducted to prepare the novel bird repellent compounds of this invention. In a typical reaction, 10 grams of sodium hydride was dissolved in 151 grams of ammonia and the mixture heated to a temperature of 80° C. During a period of 4 hours and 7 minutes, 430 grams of butadiene was injected into the mixture at a rate such that the exothermic heat of reaction could be controlled. At the termination of the injection, the mixture was cooled and extracted with a 10 percent aqueous hydrochloric acid solution until the aqueous phase of the mixture tested acid to litmus paper. The phases were separated and the organic phase was washed with water and neutralized with sodium hydroxide. The amount of neutralized acid-insoluble product recovered was 302 grams. This product was identified as Sample "A." Three other reactions were conducted and the products recovered were identified as Samples "B," "C" and "D."

The following examples illustrate the effectiveness of the bird repellent compounds of this invention. It is to be understood that these examples are for the purpose of illustration and the invention is not intended to be limited thereto.

EXAMPLE I

A cage 8 feet long was constructed with trapezoidal-shaped ends which measured 6 inches wide at the bottom, 2 feet wide at the top, and 3 feet wide at a point midway between the top and bottom. A roosting bar was attached to the interior surfaces of the ends such that it extended over the entire length of the cage. A system for exhausting air was attached to one end of the cage. The opposite end of the cage was provided with a screen covered by a curtain which would allow air but not light to pass into the cage. A plurality of translucent panels were positioned on the top surface of the cage so as to allow diffused light to enter. This type of cage simulated natural roosting conditions for birds. A plurality of wires of small diameter were placed across the cage just above the bottom surface to discourage roosting in any other place but the roosting bar. Two starlings were released in the cage and their conduct observed. After the starlings had become accustomed to their surroundings, it was determined that they spent approximately 95 percent of the time on the roosting bar. In order to evaluate the effectiveness of the bird repellent compositions of this invention, the compounds were deposited on the roosting bar and a roosting index defined as the ratio of the time spent by the birds on the roosting bar to the total elapsed time was used to determine the utility of the several compounds. A perfect bird repellent would result in a roost index of zero. On the basis of data reflecting the activity of the starlings without any compound on the roosting bar, the roosting index was calculated to be in excess of 0.9.

The results of several tests which were conducted using the compounds prepared and identified as Samples A, B, C and D are reflected in Table I below. In all tests, the compounds were deposited on the roosting bar and the ratio of the time the starlings spent on the roosting bar to the total elapsed time was determined.

*Table I*

| Acid-insoluble butadiene amination sample: | Roost index |
|---|---|
| A and B (mixture) | 0.00 |
| C | 0.21 |
| D | 0.59 |

It can be seen from the above table that the mixture of compounds identified as Samples A and B is very effective as a bird repellent because the starlings did not spend any time on the roosting bar. The compounds identified as Samples C and D are also effective bird repellents as compared with the activity of the starlings before the compounds were applied to the roosting bar. Although the cage was designed to simulate actual roosting conditions, the starlings did not have as much freedom in selecting a place to rest as they would have in their natural environment. If the choice of resting places would have been greater, the roosting indexes for compounds C and D would have undoubtedly been lower.

EXAMPLE II

The compounds prepared and identified in accordance with this invention as Samples A, B, C and D were field tested to determine their effectiveness as bird repellents under actual conditions over long periods of time. A shed for sheltering cattle was found to be used as a resting place for a flock of over 1000 starlings daily. The starlings rested on open beams located beneath the roof of the shed. The compounds of this invention were applied to the beams and the conduct of the starlings was observed during a period of several weeks. The results of these tests are reported as follows in Table II.

*Table II*

| Acid-insoluble butadiene amination sample: | Resulting decrease in roosting flock |
|---|---|
| A and B (mixture) | 70% decrease on 1st night; 100% decrease in 6 days. |
| C | 100% decrease in 9 days. |
| D | 60% decrease in 3 days; 80% decrease in 9 days; 95% decrease in 13 days. |

On the basis of the data reflected by Table II above, it can be seen that the acid-insoluble portion of the amination reaction products prepared in accordance with this invention are very effective bird repellents. Although the tests were conducted using starlings, it is obvious that the compounds are equally effective for deterring birds such as pigeons, blackbirds, sparrows and the like from resting on a particular surface.

Although the invention has been described in considerable detail, it is obvious that many variations and modifications can be made without departing from the spirit and scope thereof.

We claim:

1. A method of repelling birds which comprises applying to a locus from which birds are to be repelled the mineral acid-insoluble portion of the reaction product obtained by contacting a conjugated diolefin selected from the group consisting of 1,3-butadiene, isoprene, piperylene, 1-phenyl- 1,3-butadiene, and 2,3-dimethyl-1,3-butadiene with a compound having the formula

wherein $R_1$ is selected from the group consisting of hydrogen, alkyl, aryl, aralkyl, alkaryl, cycloalkyl, and combinations thereof, and $R_2$ is selected from the group consisting of hydrogen, alkyl, aryl, aralkyl, alkaryl, cycloalkyl and combinations thereof, and wherein the total number of carbon atoms represented by $R_1$ and $R_2$ does not exceed 12, said contacting being conducted under conditions sufficient to produce said reaction product.

2. A method according to claim 1 wherein the mineral acid-insoluble portion of the reaction product is applied by means of a liquid carrier selected from the group consisting of water, acetone, kerosene, ethyl acetate, and isoparaffinic hydrocarbons which boil in the range of from about 260° to 800° F.

3. A method according to claim 1 wherein the mineral acid-insoluble portion of the reaction product is applied in the form of a dust dispersed in kieselguhr.

4. A method according to claim 1 wherein the mineral acid-insoluble portion of the reaction product is applied in an amount to provide from about 0.01 to 10 grams of compound per square foot of said locus.

5. A method of repelling birds from a surface which comprises applying to said surface the mineral acid-insoluble portion of the reaction product obtained by reacting 1,3-butadiene with ammonia.

6. A method according to claim 5 wherein the mineral acid-insoluble portion of the reaction product is applied by means of a liquid carrier selected from the group consisting of water, acetone, kerosene, ethyl acetate, and isoparaffinic hydrocarbons which boil in the range of from about 260° to 800° F.

7. A method according to claim 5 wherein the mineral acid-insoluble portion of the reaction product is applied in the form of a dust dispersed in kieselguhr.

8. A method according to claim 5 wherein the mineral acid-insoluble portion of the reaction product is applied in an amount to provide from about 0.01 to 10 grams of compound per square foot of said surface.

References Cited by the Examiner
UNITED STATES PATENTS
2,726,980  12/1955  Goodhue _____ 167—22

JULIAN S. LEVITT, *Primary Examiner.*

S. J. FRIEDMAN, *Assistant Examiner.*